United States Patent [19]

Ho

[11] Patent Number: 6,076,161
[45] Date of Patent: *Jun. 13, 2000

[54] MICROCONTROLLER MODE SELECTION SYSTEM AND METHOD UPON RESET

[75] Inventor: Franklin Sai-Wai Ho, San Carlos, Calif.

[73] Assignee: National Semiconductor Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,020

[22] Filed: Aug. 25, 1997

[51] Int. Cl.⁷ ........................................ G06F 11/34
[52] U.S. Cl. ............................ 713/2; 713/1; 713/100
[58] Field of Search ............................ 395/651, 652, 395/653; 713/1, 2, 100

[56] References Cited

U.S. PATENT DOCUMENTS

| | | | |
|---|---|---|---|
| 5,339,426 | 8/1994 | Aoshima | 395/700 |
| 5,465,357 | 11/1995 | Bealkowski et al. | 395/700 |
| 5,732,268 | 3/1998 | Bizzarri | 395/652 |

*Primary Examiner*—Ayaz R. Sheikh
*Assistant Examiner*—Tim Vo
*Attorney, Agent, or Firm*—Skjerven, Morrill, Macpherson, Franklin & Friel LLP; Edward C. Kwok

[57] ABSTRACT

A system and method for selecting a post-reset operating mode for a microcontroller. The system of this invention includes a mode indicating means to communicate to the microcontroller the desired post-reset operating mode. These means may include pin(s), and/or bit flags in main memory or register. A mode selection logic circuit receives the mode detector information. If the program code corresponding to the desired operating mode has a starting address in main memory different from the default starting address of the first fetch instruction to the CPU, then the mode selection logic disables the program memory to prevent the first instruction fetch by the CPU, and instead, inserts a surrogate branch instruction onto the data bus causing the CPU to BRANCH to the starting address of the program code corresponding to the desired post-reset operating mode. Re-enabling the program memory after insertion of the surrogate branch instruction permits the CPU to execute the appropriate program code to put the microcontroller in that desired operating mode.

21 Claims, 4 Drawing Sheets

MICROCONTROLLER MODE SELECTION SYSTEM AND METHOD UPON RESET

BACKGROUND OF THE INVENTION

1. Field of the Invention

The invention pertains to microcontrollers, and more particularly, to a microcontroller system and method for enabling direct selection of operating modes upon reset or start-up.

2. Description of the Related Art

Microcontrollers are used in a wide variety of products where computerized control is desired. A typical microcontroller includes on the same integrated circuit ("chip") a microprocessor core (CPU) along with circuits for performing various input, output, and memory functions.

Microcontrollers are programmed to interface with the various electronic and electro-mechanical systems of a host product. A microcontroller provided with end-of-line or field programming capability allows user code to be programmed into the microcontroller either during the final step of manufacturing prior to shipping, or in the product via a predefined user programming interface. The latter programming option, popularly known as the "in-system program" (ISP) capability, is accomplished by placing the microcontroller in a specific programming mode called the ISP operating mode. The ISP code implementing the ISP mode typically resides on the chip, with the user providing information and verifying the result through the predefined interface.

In the prior art, the ISP code resides at a predetermined address within the same memory space ("user space") as the USER code. Typically, the starting address of the ISP code is set equal to the default value of the CPU's first start address. The USER code's starting address is placed at some other address of the user space. Upon start-up or reset, the microcontroller begins executing the ISP code in user space from the CPU default starting address. Thus, the microcontroller in the prior art is forced to execute the ISP programming code first, even though the USER mode may be desired.

An example of the reset system and method of the prior art is shown in FIG. 1. Upon startup or reset 10 the microcontroller jumps at step 30 to the default starting address of the program code in user space to begin executing program code in user space. Since the starting address of the program code in user space is also the starting address of the ISP code, the CPU begins execution of the ISP code section of program memory (step 34) even though a different post-reset mode may be desired. To avoid unnecessarily entering the ISP mode, a solution of the prior art is to have the desired mode be indicated by a register which stores the logic state of environment pins. The state of the environment pins is set by the user. In that solution, the first line of ISP code instructs the CPU to check the environment register to determine whether to place the microcontroller in ISP mode or in USER mode (step 40). The CPU is instructed to continue execution of code in ISP mode or, alternatively, to jump to a USER code start address depending on how the environment register is set. If ISP mode is selected, the processor continues to sequentially execute the ISP code to perform in-system programming (step 50) of the microcontroller. Once programming is complete, a decision may optionally be made to either halt further execution of program code (step 65), go to the USER mode (step 60), or reset the microcontroller. If USER mode is selected, the CPU jumps to the USER code starting address (step 70).

Alternatively, the USER code can be placed at the starting address of the user space and the ISP code placed elsewhere in the user space. In this event, the USER code is executed first as the default mode at reset. The microcontroller does not execute ISP code until expressly branched to from the USER code. While this configuration eliminates the additional cycles that would ordinarily be required to determine if USER mode is desired, as when the ISP code is at the starting address of the program code, additional program instructions in USER code are required, as well as additional CPU bus cycles, however, to effect branching to the ISP code. Further, in this configuration, the ISP code residing in user space, is subjected to a memory size constraint, and risks being overwritten by USER code.

A problem associated with placing both the USER code and the ISP code in user space, as is done in the reset systems of prior art microcontrollers, is the fixed amount of memory space available to the ISP code. In the event the amount of memory required for the ISP code exceeds the original predetermined allocation, it may be difficult or impossible to increase the amount of memory available to the ISP code since the USER code typically begins at an address immediately following the ISP code, thus bounding the size of memory available to the ISP code. As a result, any improvements or enhancements in the ISP code that require additional memory beyond the previous allocation cannot be accommodated. Thus any advantage that might otherwise be enjoyed by providing an enhanced ISP code will not be available to the microcontroller.

A related problem associated with locating the ISP code in user space is the possibility that ISP code may be written over by new USER code. Since in-system programmable microcontrollers can be programmed in the host product, a programmer can inadvertently overwrite the ISP code with modified or upgraded USER code, thus destroying future ISP capability.

Accordingly, there is a need for a microcontroller reset system and method that does not limit the amount of memory available for ISP code. There is also a need for a microcontroller reset system and method wherein the code associated with the desired operating mode is independent of, or transparent to, any other code associated with an alternate operating mode, thus permitting immediate execution of the code associated with the desired operating mode without first going to an alternate mode and the additional step of a branch instruction.

SUMMARY OF THE INVENTION

The present invention provides an improved microcontroller that overcomes the limitations of prior art microcontroller reset systems and methods.

The invention provides a memory wherein the in-system programming (ISP) code resides in a memory space separate from the user memory space, unbounded by other code.

The present invention provides hardware determination of the desired mode upon reset and direct execution of the desired mode.

This invention provides a mode logic circuit for detecting the desired post-reset or post start-up mode and for providing instructions to the CPU to branch to the corresponding start address for that mode thus bypassing the requirement of a branch instruction, as well as the additional CPU cycles required therefore, and to permit transparent execution of the code for the desired mode independent of the other modes.

An improved microcontroller system of the present invention includes a processor or central processing unit (CPU), a bootstrap ROM for initializing the various microcontroller systems upon startup or reset, and a program memory. The improvement includes a hardware-based mode indicator, a mode detector circuit (MDC) for determining the desired operating mode at start-up or reset based on the logical state of the mode indicator, and a mode selection logic circuit (MSL) that identifies the desired operating mode at start up and correlates that desired operating mode with the appropriate set of program code in program memory. The MSL can disable the program memory, so that the first instruction fetched by the CPU coming out of reset or start-up is not placed on the memory data bus by the program memory. Instead, the MSL provides the first program code instruction. By so doing, this system permits direct execution of a program code corresponding to the desired start-up, or reset, operating mode, without first having to execute test and branch instructions from an unwanted or undesired operating mode.

Thus, execution of the desired program code is exclusive of, or transparent to, other alternate codes contained in program memory.

Unlike the program memory of the prior art wherein the USER code and the ISP code shares the same memory space, the program memory of this invention is optionally partitioned, with each partition containing its own program code set and each code set having its own unique starting address. The program memory of the present invention may be on-chip with the CPU core, off-chip as a separate discrete device, or divided between on-chip and off-chip memory circuits. The physical location (i.e., on-chip versus off-chip) is of no significant consequence since the memory device(s) have a unique address. Having program memory on the same chip as the CPU, however, allows a higher clocking speed.

In one embodiment, the USER code associated with the normal operation of a host device is contained in a first portion of program memory having a starting address equal to the address of the first CPU instruction coming out of reset or start-up. By placing the USER code in this portion of memory, the microcontroller will automatically execute the USER code upon start-up or reset. Accordingly, the microcontroller is enabled on reset in the most prevalent mode without requiring any intermediate hardware or logic. Any additional program codes, such as ISP code, diagnostic code, and monitor codes, are advantageously contained in other partitions, or memory spaces, in the program memory. By placing program code for each mode in its own separate partition, sufficient physical memory can be allocated to that program code's memory space to provide for any foreseeable memory size increases due to program code upgrades.

The system of this invention includes a mode detection indicator, a mode detection circuit, and a mode selection logic (MSL) circuit. The combination of these elements permits the system of this invention to directly load the desired program code in its respective program memory space upon reset without executing program code in another undesired operating mode.

The mode indicator determines that a particular operating mode is desired upon start-up or reset of the microcontroller. The mode indicator can be implemented by, for example, setting the voltage state of one or more environment pins, an area in program memory containing one or more bits, a memory register containing one or more bits, or any combination of these elements. Where only two program modes are available, e.g., a USER mode and an ISP mode, then a single pin or a single bit will suffice to indicate the desired mode. During operation, the mode detection circuit reads the desired post-reset mode the microcontroller is to assume from the mode indicator. The mode indicator can be set from user input through an appropriate user interface.

The output signal of the mode detector circuit is read by the mode selection logic circuit. Upon restart or reset of the microcontroller, the MSL circuit identifies the start address of the program code to be executed based on the mode detector circuit's determination of the desired operating mode. If the desired mode requires executing program code having a start address different from the default start address specified by the CPU, the MSL circuit disables the program memory during the first fetch cycle, thus preventing the program code at the default start address from executing, and instead places a "surrogate" branch instruction on the data bus instructing the CPU to jump or branch to the start address of the program code corresponding to the desired post-reset operating mode. The program memory is enabled by the MSL circuit immediately after the modified instruction has been asserted to permit continued execution of the desired program code by the CPU.

Where the desired post-reset operating mode corresponds to program code having a starting address corresponding to the default starting address, the MSL circuit is bypassed. In this case, the program memory is not disabled, nor is a surrogate instruction placed on the data bus since the desired starting address is the default starting address. Typically, the program code at this address is the USER code corresponding to the mode most likely to be desired by the user and allowing for the normal operation of the host product. With this configuration, when the mode indicator pin(s) or bit(s) are set to indicate USER mode, the microcontroller will go directly into USER mode.

Regardless of the post-reset mode specified, the system and method of this invention enables the microcontroller to reset or restart in any desired mode without first having to execute an instruction code sequence intended for an alternate mode.

BRIEF DESCRIPTION OF THE DRAWINGS

The present invention may be better understood by those skilled in the art by reference to the accompanying drawings.

The use of the same reference symbols in different drawings indicates similar or identical items.

DESCRIPTION OF THE PREFERRED EMBODIMENT(S)

Figure 1:
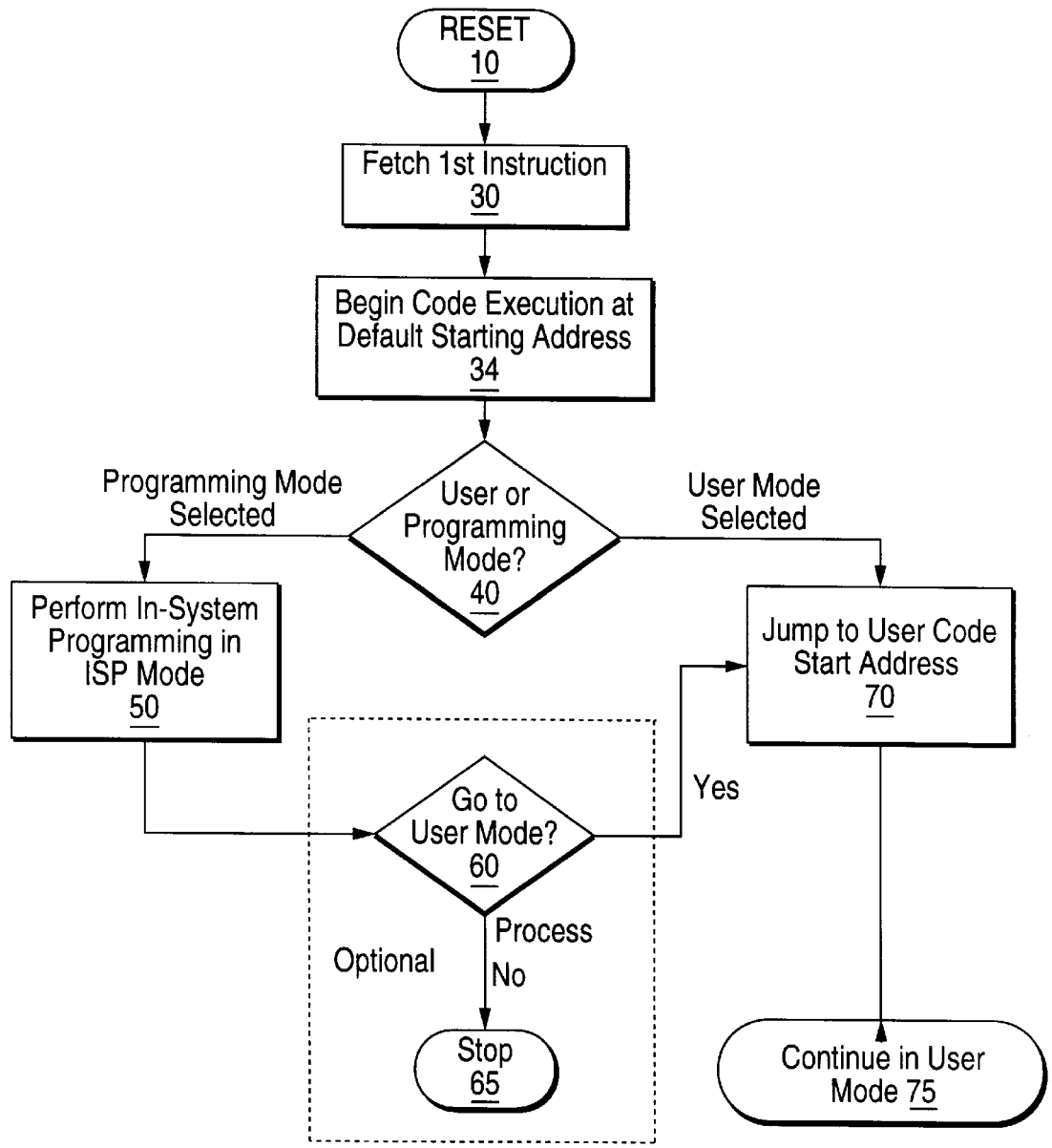
FIG. 1 is a process flow diagram of a microcontroller mode selection process of the prior art.
Figure 2:
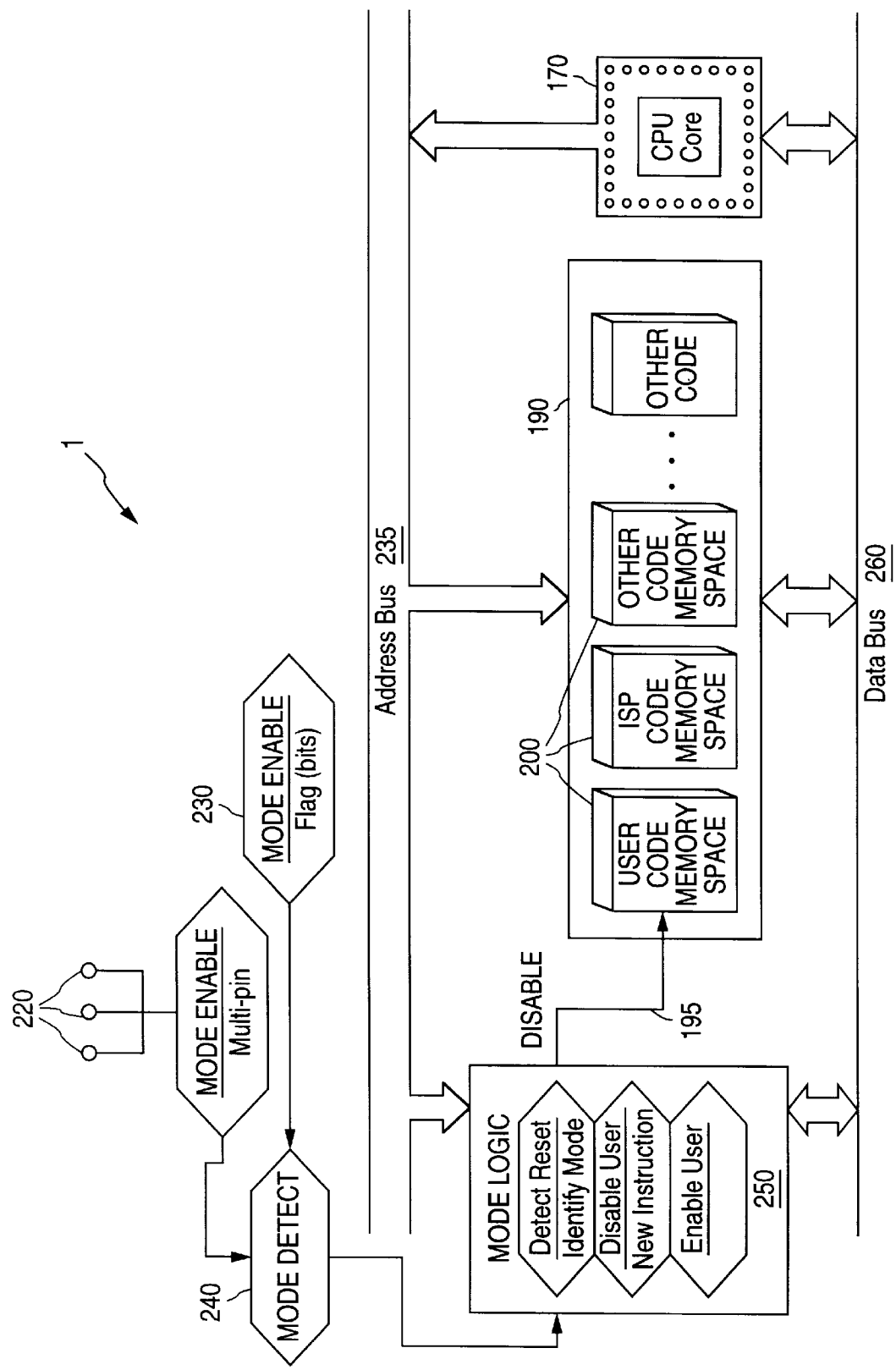
FIG. 2 is a diagram of a first embodiment of a microcontroller reset mode selection system of the present invention permitting mode selection from a plurality of operating modes.

A first embodiment of the microcontroller system of the present invention is shown diagramatically in FIG. 2. Each of the elements shown in FIG. 2 may be fabricated on a single die, as discrete devices interconnected to one another on a printed circuit board, or as a combination of a multi-device package and discrete components in cooperative electrical communication. The following detailed description, however, refers to the various elements as residing on a single die by way of illustration and example, and not by limitation, so as to more clearly disclose the subject matter of this invention.

Referring now to FIG. 2, the microcontroller system 1 of this invention comprises a central processing unit (CPU) core 170, which includes at least one of an arithmetic logic unit, a bus unit, and control unit. The CPU may be an 8-, 16-, 32-, or 64-bit processor.

Once a reset or start-up is initiated, CPU 170 fetches its first instruction at a predefined, fixed starting address from program memory. In FIG. 2, the program memory 190 is shown divided into as many partitions or spaces 200 as there are program code sets, each program code set corresponding to a different operating mode. The partitions may be physical partitions defined by separate memory devices, or they may be logically partitioned, whereby each partition is identified as a predefined allocation of the total memory space. By allotting each program code set its own memory partition, sufficient memory may be provided to allow for program size increases and to provide the additional physical memory to accommodate those increases. Each memory space containing program code has a starting address for enabling fetching and execution of the program within that memory space by CPU 170.

The microcontroller 1 includes one or more mode selector indicators for identifying the desired post-reset operating mode. As shown in FIG. 2 external pins 220, and memory flags 230 provide alternative mode selector indicator mechanisms by which the desired post-reset operating mode may be identified. One or more environment pins 220 on the package of microcontroller 1 may be reserved for indicating the desired starting or reset mode. The voltage levels of the pins provide the logic states necessary to identify the desired mode. These voltage levels are set via an appropriate input and output (I/O) interface, for example, during startup or reset of the microcontroller.

Alternatively, or in addition to the environment pin(s) 220, a mode indicator flag 230 may be implemented in a small portion of the main memory, or in a register in microcontroller 1, to indicate to microcontroller 1 a post-reset operating mode. Mode indicator flags 230 may be initialized to a predetermined value during end of line programming, and can subsequently be set during execution of the program previously running prior to reset of microcontroller 1. Alternatively, mode flags 230 may be set during the reset, but before the flags are detected by the microcontroller. Where both indicator mechanisms are used, mode detector circuit 240 examines both pins 220 and memory flags 230 to determine the mode to enable microcontroller 1 upon reset or restart. Where a conflict between the two indicators exists, a pre-defined protocol assigns preemptive priority in favor of one of the indicators.

During reset or start-up of microcontroller 1, a mode select logic (MSL) circuit 250 receives the desired mode information from mode detector circuit 240. MSL circuit 250 detects CPU 170's fetching of an instruction on address bus 235. The instruction is fetched by the CPU at the default starting address of the default program code set. In this instance, the default program code is the USER code. If the desired mode is the USER mode, MSL circuit 250 does not interfere in the reset or start-up process since the USER code start address is the default start address. However, if the desired mode read by the MSL circuit 250 is not USER mode, MSL circuit 250 disables the output signals of program memory 190 via a disable control signal on a trace or wire 195. In addition, MSL circuit 250 provides a "surrogate" branch instruction to CPU 170 on data bus 260. Once the surrogate branch instruction is read by CPU 170, MSL circuit 250 re-enables the output from program memory 190 by negating the control signal on trace 195. The branch instruction issued by MSL circuit 250 causes CPU 170 to jump to the starting address of the program code corresponding to the operating mode indicated by the mode detector circuit 240.

Figure 3:
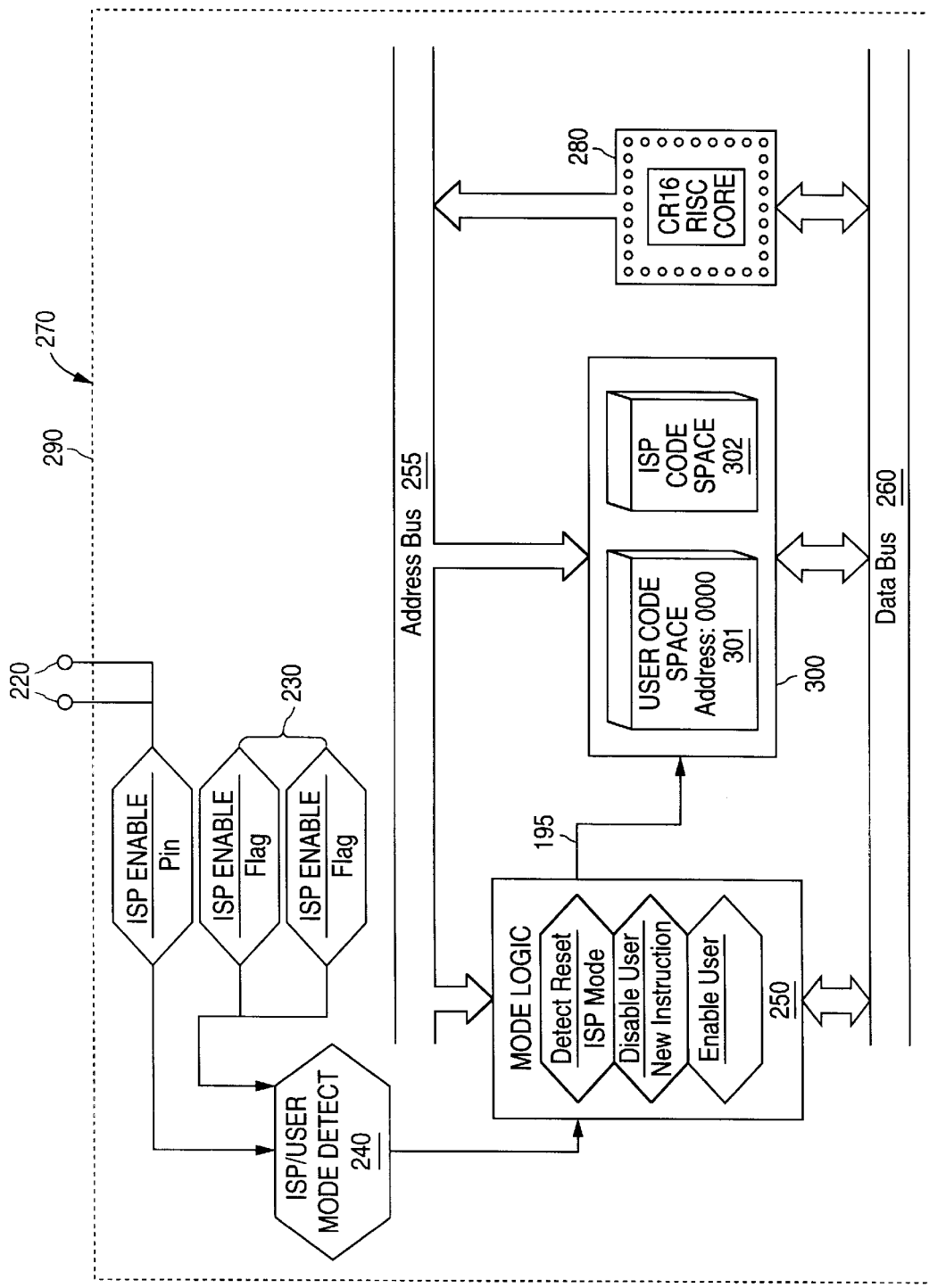
FIG. 3 is a diagram of a second embodiment of a microcontroller reset mode selection system of the present invention.

FIG. 3 shows a second embodiment of the present invention in dual operating mode microcontroller 270. In microcontroller 270, CPU 280 is a CPU with an 8-bit, 16-bit, 32-bit or 64-bit data path, such as National Semiconductor's (Santa Clara, Calif. U.S.A.) CR16A RISC core 16-bit processor. The program code for this processor always starts at the default start address $0000_{16}$ coming out of reset. Microcontroller 270 is implemented as a single chip, and includes the elements shown within phantom boundary 290. At least one mode indicator pin 220 and at least one bit flag 230 (in either the main memory or a register) provides the mechanism for indicating either a USER mode, an ISP mode, a test mode, or the like on reset or start-up of microcontroller 270. As shown in FIG. 3, both mode indicator pins 220 and mode flags 230 are provided, and to the extent the two indicators provide conflicting indications of the desired mode on reset, the mode detect circuit 240 may assign preemptive priority to one or the other indicator. Of course, microcontroller 270 can also be implemented with either only pins 220 or flags 230 to perform the mode indication function. Mode indicator pin 220 is driven by a latch, a switch, hard-wired to a logic level or through a connector to a signal originating from another part of the user system. If it is driven by a latch, that latch may optionally be set up by a keyboard, a modem, or a serial port.

Main memory 300 is partitioned or divided into two logical spaces: a USER code space 301, corresponding to USER mode, starting at address $0000_{16}$ and ending at address $7FFF_{16}$, and an ISP code space 302 having a starting address of $DC00_{16}$. In the embodiment shown in FIG. 3, ISP code resides in ISP code space 302. This configuration provides the advantage of providing an exclusive program code space 301 for USER code. Additionally, placement of the ISP program code in memory space 302 permits allotting additional physical memory for enhancement of the ISP code, without simultaneously affecting the available memory space or starting address of the USER code. Should ISP mode be indicated as the operating mode upon reset, the CPU 280 instruction fetch from address $0000_{16}$ of the main memory is detected by MSL circuit 250 which immediately disables, via a control signal on disabling trace or wire 195, the output signals of main memory 300. MSL circuit 250 then places a "surrogate" instruction on data bus 260 to instruct CPU 280 to branch to $DC00_{16}$, corresponding to the starting address of the ISP code. This surrogate instruction is read by the CR16A CPU 280, resulting in execution of ISP code beginning at address $DC00_{16}$. If USER mode is detected by the mode detector circuit 240, then MSL 250 does not participate in the reset process, and remains dormant.

Figure 4:
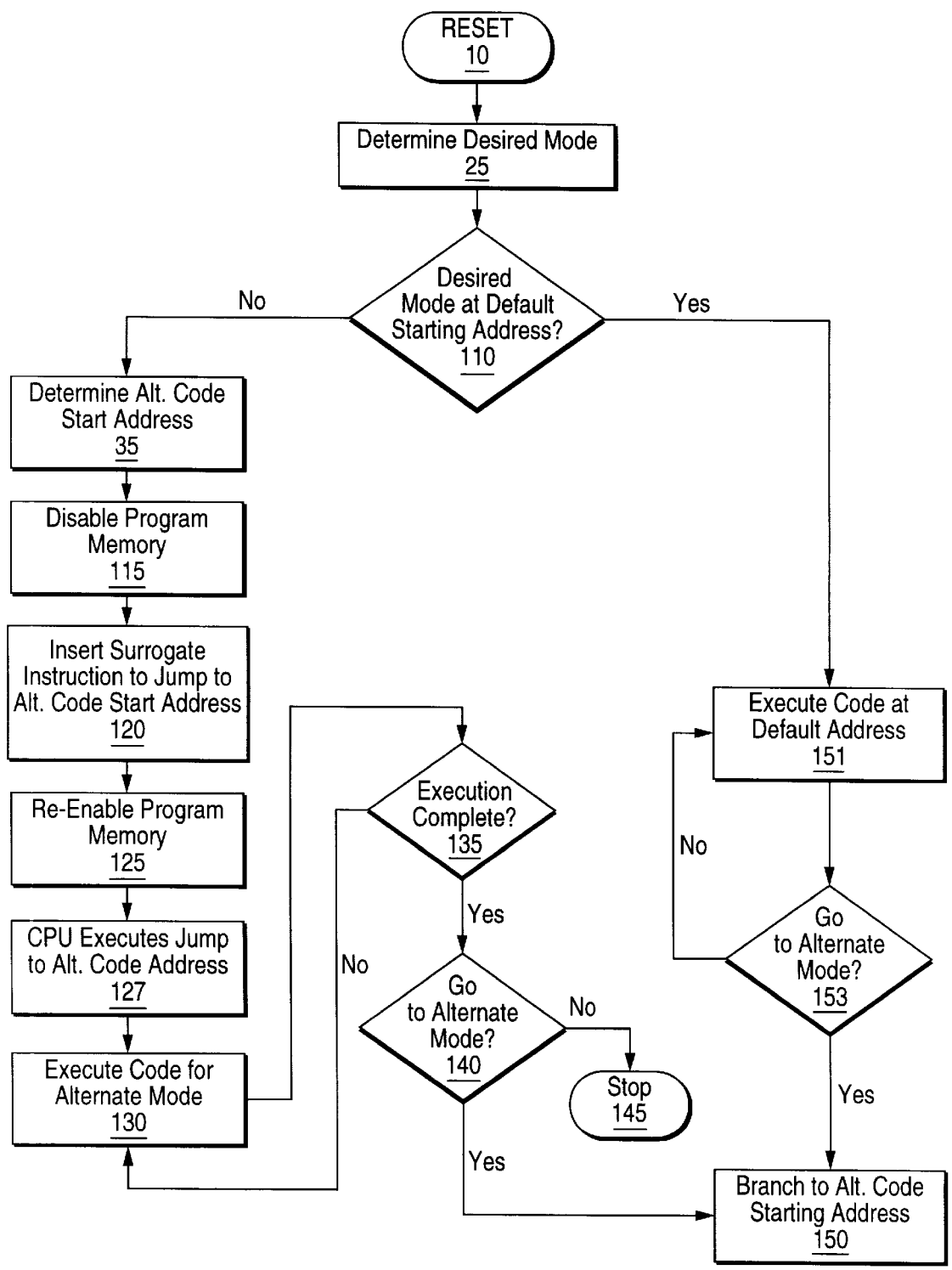
FIG. 4 is a process flow diagram of the microcontroller reset mode selection method of the present invention.

The process of this invention is illustrated by the flow diagram of FIG. 4. As shown in FIG. 4, upon reset step 10, the CPU asserts a first instruction starting address on the address bus. On detecting start-up or a reset, the MSL detects the first fetch instruction request, and identifies the desired operating mode from the mode detector at step 25. The MSL then determines at step 110 whether or not the code for the requested mode resides at the default starting address of program memory. If the requested mode does not reside at the default starting address of the program memory, the MSL determines the starting address of the program code corresponding to the desired operating mode at step 35, disables the program memory at step 115, thus preventing the program memory from asserting the default first instruction onto the data bus. The MSL then inserts a surrogate instruction onto the data bus at step 120, instructing the CPU to execute a jump at step 127 to the starting address of the program code corresponding to the desired post-reset operating mode as determined by the mode detector circuit. After the surrogate instruction is inserted, the program memory is re-enabled at step 125 to permit access of the program code at step 130 by the CPU. Once execution of the code is complete at step 135, the user may optionally decide at step 140 to enter another mode corresponding to program code residing elsewhere in the program memory. In that event, a branch instruction is issued at step 150 to the CPU to jump to the starting address of the desired program code. Alternatively, the program may simply be halted at step 145.

Where the desired post-reset mode as determined by the mode detector circuit at step 25 corresponds to the program code residing at the default starting address, the MSL circuit remains dormant. Consequently, the CPU is allowed to fetch instructions from the default starting address to execute at step 151 the code residing there. During execution of the program code, the user may optionally decide at step 153 to either continue in the current mode, or to branch to an alternate code set (step 150).

The system and method of the present invention provides a solution to a problem discovered by me; i.e., that system response, and consequently system efficiency, are compromised by first having to pass through an alternative operating mode prior to loading the program code of a desired mode involving the CPU and its attendant cycles to determine which operating mode to enable upon reset. By making the desired program code and operating mode independent of, or transparent to, other program codes and modes, and by eliminating the CPU from the operating mode selection process on reset, system response and efficiency are improved. Further, customers developing macrocode do not need to be aware of the other operating modes on the chip, thus reducing customer code development complications.

Various modifications and variations within the scope of this invention are possible in view of the above description and the drawings. For example, the mode selection logic circuit may be modified to write the starting address of the desired post-reset program code corresponding to the desired post-reset operating mode to a register in the CPU, to main memory, or as an entry in an instruction buffer. In this case, the CPU fetches the starting address from the designated register, section of memory, or instruction buffer and immediately branches to that address to begin execution of the program code. This improvement includes the advantage of not having to disable and then re-enable the program memory.

What is claimed is:

1. A microcontroller comprising:
   a mode indicator for indicating one of a plurality of operating modes the microcontroller is to assume upon start-up or reset;
   a program memory for storing a plurality of program code sets including a first program code set, each of the plurality of program code sets corresponding to one of the plurality of operating modes;
   a central processing unit (CPU) for generating a program memory default start address in the first CPU instruction-fetch cycle after start-up or reset, the program memory default start address being equal to the start address of the first program code set; and
   a logic circuit for detecting the operating mode indicated by the mode indicator upon start-up or reset, and if the indicated operating mode corresponds to the first program code set, then an instruction located at the program memory default start address is provided to the CPU for execution, but if the indicated operating mode corresponds to a program code set other than the first program code set, then the logic circuit prevents the instruction located at the program memory default start address from being provided to the CPU and instead the logic circuit provides a surrogate instruction to the CPU for causing the CPU to branch to the start address of said program code set other than the first program code set.

2. The microcontroller of claim 1 wherein the logic circuit prevents the instruction located at the program memory default start address from being provided to the CPU by disabling the program memory during the first CPU instruction-fetch cycle, the logic circuit enabling the program memory immediately after the surrogate instruction is provided to the CPU to allow execution of said program code set other than the first program code set.

3. The microcontroller of claim 1 wherein the surrogate instruction includes the starting address of said program code set other than the first program code set.

4. The microcontroller of claim 1 wherein the logic circuit identifies the start address of the program code set corresponding to the indicated operating mode, and if the identified start address is not equal to the program memory default start address then the logic circuit causes the CPU to branch to the identified start address for execution of the program code set corresponding to the indicated operating mode.

5. The microcontroller of claim 1 wherein the logic circuit comprises:
   a mode detector circuit for detecting the operating mode indicated by the mode indicator; and
   a mode selection logic for detecting the CPU's first instruction-fetch request after start-up or reset, and correlating the detected operating mode with a corresponding program code set in the program memory, and if the corresponding program code set is other than the first program code set, the mode selection logic disabling the program memory, providing the surrogate instruction to the CPU, and enabling the program memory after the surrogate instruction is provided to the CPU.

6. The microcontroller of claim 1 further comprising an address bus and a data bus each being connected to the program memory, the CPU, and the logic circuit.

7. The microcontroller of claim 1 wherein the mode indicator is hardware-based.

8. The microcontroller of claim 1 wherein the mode indicator comprises any one of or any combination of: one or more environment pins, one or more bits in the program memory, and a memory register containing one or more bits.

9. The microcontroller of claim 1 wherein the operating mode to be assumed by the microcontroller upon start-up or reset is indicated by applying appropriate voltage level(s) to one or more environment pins.

10. The microcontroller of claim 1 wherein the mode indicator is set by a user input through a user interface.

11. The microcontroller of claim 1 wherein the program memory comprises a plurality of memory partitions, each memory partition containing one of the plurality of program code sets, each program code set having a unique starting address, and sufficient physical memory being allocated to each program code set's memory partition to enable program code set upgrades.

12. The microcontroller of claim 11 wherein the memory partitions are either physical partitions defined by separate memory devices, or logical partitions of a memory space wherein each partition is identified as a predefined allocation of the total memory space.

13. The microcontroller of claim 1 wherein the microcontroller is built either as an integrated circuit or from discrete components.

14. The microcontroller of claim 1 wherein the plurality of operating modes includes a user mode, an in-system programming (ISP) mode, a diagnostic mode, and a monitor mode, the user mode being associated with the normal operation of a host device, the user mode corresponding to the first program code set.

15. A method for selecting one of a plurality of operating modes to be assumed by a microcontroller upon start-up or reset, the microcontroller having a central processing unit (CPU) and a program memory for storing a plurality of program code sets including a first program code set, each of the plurality of program code sets corresponding to one of the plurality of operating modes, the method comprising:

upon start-up or reset, detecting a preselected one of the plurality of operating modes the microcontroller is to assume;

the CPU generating a program memory default start address in the first CPU instruction-fetch cycle after start-up or reset, the program memory default start address being equal to the start address of the first program code set;

if the detected operating mode corresponds to the first program code set, providing an instruction located at the program memory default start address to the CPU for execution; and if the detected operating mode corresponds to a program code set other than the first program code set:
preventing the instruction located at the program memory default start address from being provided to the CPU; and providing a surrogate branch instruction to the CPU for causing the CPU to branch to the start address of said program code set other than the first program code set.

16. The method of claim 15 further comprising:

if the detected operating mode corresponds to a program code set other than the first program code set:
disabling the program memory during the first CPU instruction-fetch cycle to prevent the instruction located at the program memory default start address from being provided to the CPU; and
enabling the program memory immediately after providing the surrogate instruction to the CPU to allow execution of said program code set other than the first program code set.

17. The method of claim 15 wherein the surrogate instruction includes the starting address of said program code set other than the first program code set.

18. The method of claim 15 further comprising:

identifying the start address of the program code set corresponding to the detected operating mode; and if the identified start address is not equal to the program memory default start address, causing the CPU to branch to the identified start address for executing the program code set corresponding to the detected operating mode.

19. The method of claim 15 further comprising indicating the operating mode to be assumed by the microcontroller upon start-up or reset by any one of or any combination of: one or more environment pins, one or more bits in the program memory, and a memory register containing one or more bits.

20. The method of claim 15 further comprising indicating the operating mode to be assumed by the microcontroller upon start-up or reset by applying appropriate voltage level (s) to one or more environment pins.

21. The method of claim 15 further comprising indicating the operating mode to be assumed by the microcontroller upon start-up or reset by a user input through a user interface.

* * * * *